Oct. 7, 1958
B. HAMPEL
2,854,772
ADAPTABLE INDICATOR ASSEMBLY FOR SMALL ARTICLES
WITH INTERCHANGEABLE GRAPHIC SIGN CARRIERS
Filed Oct. 12, 1955
2 Sheets-Sheet 1
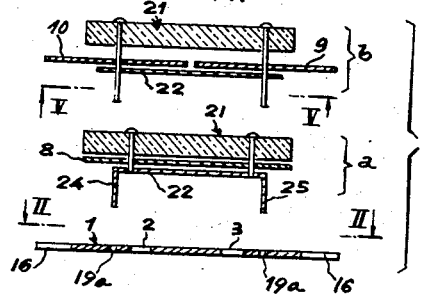
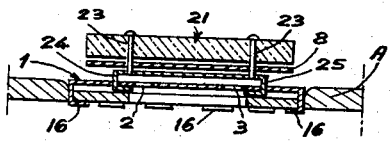
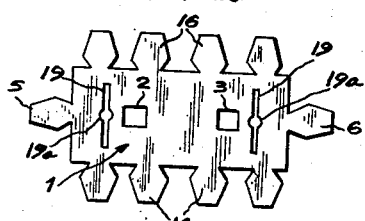
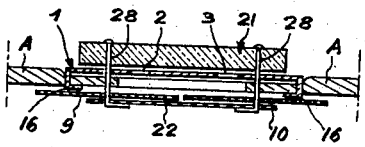
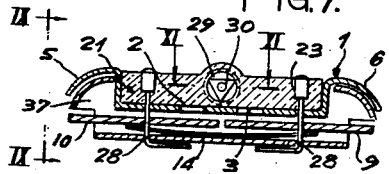
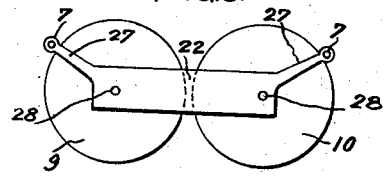
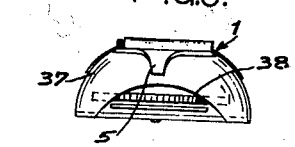
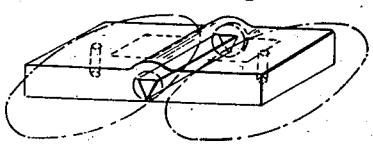
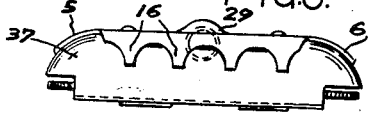
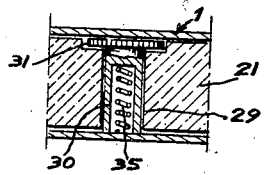
INVENTOR
BERNARD HAMPLE
BY Oct. 7, 1958
B. HAMPEL
2,854,772
ADAPTABLE INDICATOR ASSEMBLY FOR SMALL ARTICLES
WITH INTERCHANGEABLE GRAPHIC SIGN CARRIERS
Filed Oct. 12, 1955
2 Sheets-Sheet 2
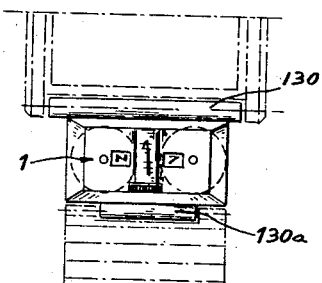
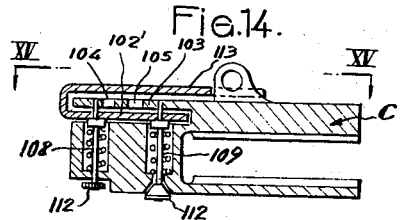
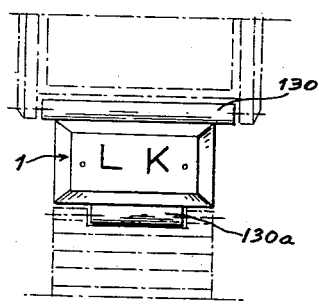
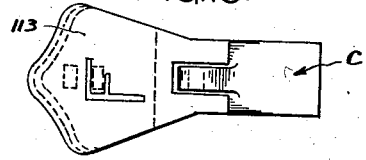
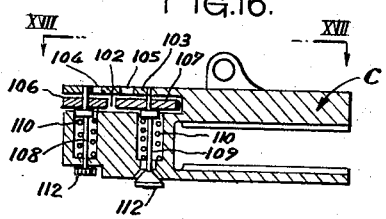
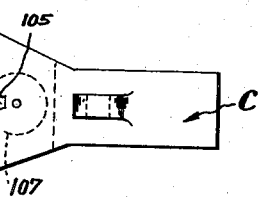
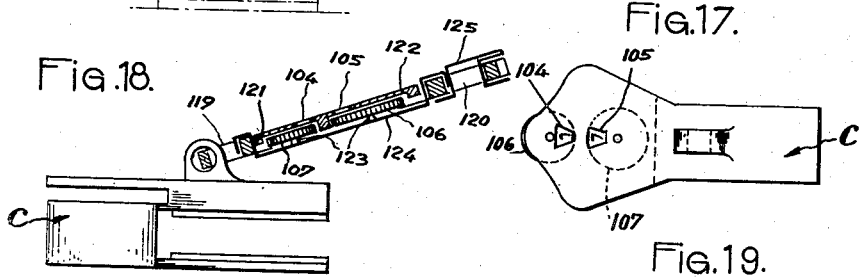
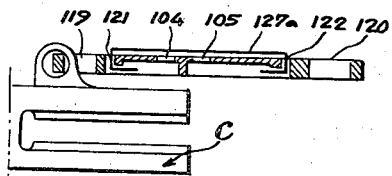
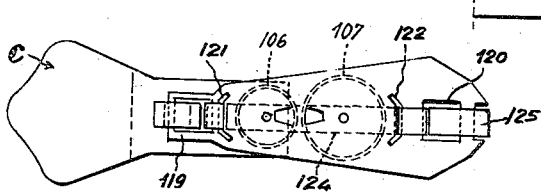
INVENTOR
BERNARD HAMPEL
BY

United States Patent Office 2,854,772
Patented Oct. 7, 1958

2,854,772

ADAPTABLE INDICATOR ASSEMBLY FOR SMALL ARTICLES WITH INTERCHANGEABLE GRAPHIC SIGN CARRIERS

Bernard Hampel, Paris, France

Application October 12, 1955, Serial No. 540,059

Claims priority, application France October 23, 1954

9 Claims. (Cl. 40—70)

The invention is relative to indicating devices used in combination with various articles, such as bags, watch wrist-bands, slips or straps, as existing in numerous fancy-goods articles.

The main object of the invention is to provide a device which is easily transformable so that it can be possible to have either an article with fixed signs, such as initials, or movable inscriptions carried by discs which can be rotated about their supporting axles.

A further object of the invention is to provide such device so that it can be used independently or in combination with a supporting article.

Another object of the invention is to provide a device which can be mounted above the supporting article which is only traversed by connecting means formed by the device.

Still another object of the invention consists in the possibility of combining the transformable device with an article such as the runner of a zipper or its control tongue.

A transformable indicating device for the vision of different graphic signs according to the invention comprises a support or base piece having apertures provided to receive either connecting elements of a member carrying at least one graphic sign or of means provided with rotatable discs carrying several graphic signs selectively viewable through certain apertures of said support which is provided with connecting elements to secure it with various articles.

Fig. 1 is a cross-elevation showing a first form of embodiment of the device of the invention with both its interchangeable accessories represented substantially in diagrammatical form.

Fig. 2 is a plane view taken along the line II—II of Fig. 1.

Fig. 3 is a cross-elevation corresponding to Fig. 1 and showing the device with the accessory $a$ of Fig. 1, this device being mounted on a sheet or band of flexible material and its constitutive parts being shown slightly apart.

Fig. 4 is a cross-elevation similar to Fig. 3 but showing the device with the second accessory $b$.

Fig. 5 is a diagrammatical plane view taken along the line V—V of Fig. 1.

Fig. 6 is a plane view of a first modification of the device of the invention.

Fig. 7 is a cross-elevation taken along the line VII—VII of Fig. 6.

Fig. 7a is a partial cross-elevation similar to Fig. 7 showing the device mounted on a sheet of flexible material as in Figs. 3 and 4.

Fig. 8 is a front elevation seen along the line VIII—VIII of Fig. 6.

Fig. 9 is a lateral elevation seen from the line IX—IX of Fig. 7.

Fig. 10 is a diagrammatical perspective of one of the parts of the device according to the preceding figures.

Fig. 11 is a cross-section on a larger scale taken along the line XI—XI of Fig. 7.

Fig. 12 is a plane view on a smaller scale illustrating a slight modification with respect to the embodiment shown in Fig. 6.

Fig. 13 is a plane view similar to Fig. 12, but showing the device with the accessory $a$.

Fig. 14 is a cross-elevation showing another form of embodiment of the invention in which one of the parts of the device is constituted by an existing article.

Fig. 15 is a plane view seen from the line XV—XV of Fig. 14.

Fig. 16 is a cross-elevation similar to Fig. 14 but showing the device with its second accessory $b$.

Fig. 17 is a plane view seen from the line XVII—XVII of Fig. 16.

Fig. 18 is a cross-elevation showing another application of the device according to the invention, this device being adapted for the particular application.

Fig. 19 is a cross-elevation similar to Fig. 18 but showing the device constituted as a second accessory.

Fig. 20 is a plane view corresponding to Fig. 18.

The drawing shows some specific realisations of a device constituted according to the invention, i. e. of a device allowing the use of at least two accessories one of which comprises or carries fixed graphic signs and the other movable graphic signs which can be selectively chosen to appear through window shaped apertures.

As shown by the drawing, the device mainly comprises a support or base piece 1, which is intended to enable the mounting of the accessories described below and also the eventual connection of the device with a supporting article which can be, for example, a watch wrist-band or a slip or strap as those existing in numerous fancy-goods articles.

This support or base piece 1 is provided with two lateral slots 19 having at their middle part an enlarged portion 19a, which is substantially circular. Further this support has substantially at its middle portion two enlarged apertures 2, 3.

5, 6 and 16 designate respectively terminal and lateral teeth or lugs formed at the periphery of the support 1. These teeth or lugs serve for attaching the device to a slip, strap or sheet of flexible material A represented in Figs. 3 and 4.

As shown by Figs. 1, 3 and 4, the support 1 can be used in combination either with the accessory $a$ or the accessory $b$ of Fig. 1. The accessory $a$ comprises a small plate 8 provided on its upper face with graphic signs such as initials. This small plate is mounted between a cover 21 of transparent material and a part 22 which is provided with lugs 24 and 25 designed to be engaged in the slots 19, then bent underneath the support or base piece 1, as shown in Fig. 3.

The cover component 21 of transparent material, the small plate 8 provided with graphic signs and the part 22 are secured together by means of rods 23 which are riveted or screwed in the part 22.

The accessory $b$ is constituted similarly, however it comprises circular discs 9, 10 pivotally mounted on axles 28 which are simultaneously used to connect together, as in the accessory $a$, the component 21 of transparent material, the support 1 through which they pass by the enlarged portion 19a of the slots 19 and the bottom part 22 which is designed to be placed underneath the discs 9, 10 to cross-brace the axles 28.

As it appears from Figs. 3 and 4 the strip, band or sheet A is provided with a hole of relatively great dimensions to enable the vision of the graphic signs carried by the discs located below said strip, band or sheet.

The bottom plate 22 is preferably provided with small lugs 27 as it is shown by Fig. 5, these lugs having holes or eyelets 7, so that it is possible to fix the device at various points by means of said lugs when it is not desired to connect the device to a sheet or strip of flexible material.

Figs. 6 to 11 show a slight modification according to which the device is intended to be placed eventually in an article which can be of flexible material, such as bags or the like, these articles having relatively thick walls.

According to this modification, the support or base piece 1 is shaped as a casing in which the accessories a, b can be lodged.

These figures show also the preferred form of embodiment of the accessory b which is only diagrammatically shown in Figs. 1 to 4.

The accessory is provided with a component 21 of transparent material which has a transversal hole 29. This hole contains a member 30 of polygonal cross-section which carries inscriptions (Fig. 6) on its sides that can be seen through the material constituting the transparent component 21.

The member 30 comprises at one of its ends, as shown by Fig. 11, a milled knob 31 which can be turned so as to make one or the other of the inscriptions that it carries to appear.

The member 30 is provided with a blind hole inside which is located a spring 35 bearing against the corresponding wall of the casing that forms the support 1, so that the milled knob 31 is pressed against the other wall and then prevented from turning accidentally.

The accessory a is not represented in combination with the particular form of embodiment of Figs. 6 to 11, since this accessory is identical to that described above with reference to Figs. 1 and 3. When the support 1 carries the discs 9, 10, they are slipped on the rods or axles 28, then a resilient member 14 is placed underneath the discs and the ends of the rods 28 pass through openings in member 14 and support 1, and are bent beneath said support to hold the elements assembled, as shown in Fig. 7.

When the device shown in Figs. 6 to 11 is intended to be used alone, it is provided with a belt 37 surrounding the support 1 and covering in part the discs 9, 10 which are hidden from sight with the exception of the part which appears through the notches 38 to allow their operation. The belt 37 is maintained by the teeth or lugs 16 and 5, 6.

Figs. 12 and 13 show a slight modification showing a particular application of the device which is designed to be used in combination with a watch and its wristband.

The support 1, which carries the accessory a in Fig. 13 and the accessory b in Fig. 12, is constituted as described above and provided with connecting pieces 130 and 130a respectively adapted to engage the spindles of the watch and the end of the wrist-band.

Figs. 14 to 17 and 18 to 20 show respectively the device of the invention adapted to the runner of a zipper and to its control tongue.

In Figs. 14 to 17, the support is constituted by the runner itself which is designated by reference C. For this purpose the runner is shaped at its upper part which is cut to provide a slot 102 delimited by the body of the runner and its top 103. Window-shaped openings 104, 105 are made in the top 103 so as to show the inscriptions borne by the discs 106 and 107 which may be revolved around spindles 108, 109 whose cross-section may be circular or polygonal.

The spindles 108 and 109 are elastically urged by means of springs 110 and are provided with knobs 112 enabling to disengage them from the discs 106 and 107.

The knobs 112 enable the spindles to be moved against the action of the springs 110 to ensure the positioning and withdrawal of the discs. These spindles are also used for the fixation of a plate 113 (Figs. 14 and 15) which is provided with a bent lug 102' engaging the slot 102 and holes for the passage of the end of the spindles.

As it appears, this particular form of embodiment of the invention is a full equivalent of that described previously, since the runner C acts as the support 1 and the discs 106, 107 or plate 113 are placed as the accessories a and b.

According to Figs. 18 to 20, we have shown the adaptation of the device to the operating tongue of the runner.

Generally, the control tongue of runners are provided with holes 119 and 120. For embodying the invention, we provide that tongue with slots 121, 122 whose shape may be for instance that shown in Fig. 20.

Window shaped openings 104 and 105 are also pierced in that tongue so that they communicate with circular housings for the location of discs 106, 107 pivotally mounted on axles 123 carried by a support or base piece 124 which constitute the accessory b and which are secured to the control tongue by means of bent lugs that said support or base piece 124 forms. Similarly, the accessory a carrying fixed inscriptions, such as initials, is constituted by a plate 127a which is located so as to cover in part the control tongue to which it is connected by bent lugs.

As in the preceding forms of realisation described, the accessory a covers the window shaped apertures which are used only in combination with the accessory b. The normal aperture 120 can also be used to put in place a support 125 carrying fixed inscriptions, that support being constituted similarly to the piece 127a and shaped with bent lugs to ensure its connection with the control tongue as shown by Fig. 18.

The invention is not limited to the examples of embodiment shown and described in detail, as various modifications can be made thereto without going outside its scope. In particular, it is possible to provide from the bottom side of the transparent component 21 one or several housings for the location of letters viewable through said transparent component.

I claim:

1. A portable indicating device for fancy-goods articles comprising a small portable opaque base member provided with a series of small openings, means for connecting said member with a fancy-goods article, spindles on said base member, manually operable graphic sign carrying members below said base member rotatably mounted on said spindles, and spring means through which the spindles pass urging said sign carrying members against the base member with the signs selectively viewable through said openings.

2. A portable indicating device according to claim 1, wherein said base member is constituted by a body having an upper flat portion provided with the said small openings.

3. An article as defined in claim 2, wherein the spring means and the spindles are located inside the body.

4. An article as set forth in claim 3, including knobs on the lower ends of the spindles and located beneath the body for rotating the graphic sign carrying members.

5. A portable indicating device according to claim 4, wherein said graphic sign carrying members are removably mounted on said spindles, and said spindles are axially slidable in the body against the action of said spring means to facilitate removal or replacement of the sign carrying members.

6. In an assembly unit of the character described, the combination of a support having lateral lugs for its connection with a supporting article, said support having two window shaped apertures and a pair of slots extending transversely and provided with a middle enlarged opening portion, a set of graphic sign carrier members having respectively connecting portions engaging said slots and said middle enlarged opening portion of said slots, said carrier members being provided with a plate covering said window shaped apertures, and said carrier members having discs viewable through said window shaped apertures.

7. In a unit as set forth in claim 6, a protecting cover of transparent material covering said graphic sign carrier members.

8. In a unit as set forth in claim 6, a cover of transparent material associated with said carrier members comprising discs, said discs being tangentially disposed and said cover being provided with a transverse channel extending above the tangential portion of said discs, and a rotatable element provided with graphic signs engaged in said channel and viewable between said window shaped apertures of the support through which said graphic signs of the discs are viewable.

9. In an assembly as set forth in claim 6, wherein said connecting portions comprise spindles rotatably supporting said graphic sign carrier members, and spring means through which the spindles pass urging said sign carrier members against the support, the signs selectively viewable through said apertures.

References Cited in the file of this patent

UNITED STATES PATENTS

| | | |
|---|---|---|
| 188,522 | Livermore | Mar. 20, 1877 |
| 397,774 | Briggs | Feb. 12, 1889 |
| 1,515,122 | Keys | Nov. 11, 1924 |
| 1,793,800 | Henry | Feb. 24, 1931 |
| 1,804,260 | Kerr | May 5, 1931 |
| 2,033,998 | Prager | Mar. 17, 1936 |
| 2,071,338 | Henze et al. | Feb. 23, 1937 |
| 2,503,255 | George | Apr. 11, 1950 |
| 2,551,188 | Wagner | May 1, 1951 |
| 2,607,140 | Taylor | Aug. 19, 1952 |
| 2,700,837 | Wyner | Feb. 1, 1955 |
| 2,728,167 | Knott | Dec. 27, 1955 |

FOREIGN PATENTS

| | | |
|---|---|---|
| 984,031 | France | Feb. 21, 1951 |